United States Patent
Kagawa et al.

(10) Patent No.: US 9,289,720 B2
(45) Date of Patent: Mar. 22, 2016

(54) SYSTEM AND METHOD FOR TREATING MERCURY IN FLUE GAS

(75) Inventors: Seiji Kagawa, Tokyo (JP); Hideaki Sakurai, Tokyo (JP); Nobuyuki Ukai, Tokyo (JP); Susumu Okino, Tokyo (JP); Tatsuto Nagayasu, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 14/398,079

(22) PCT Filed: May 31, 2012

(86) PCT No.: PCT/JP2012/064183
§ 371 (c)(1),
(2), (4) Date: Nov. 19, 2014

(87) PCT Pub. No.: WO2013/179462
PCT Pub. Date: Dec. 5, 2013

(65) Prior Publication Data
US 2015/0086457 A1    Mar. 26, 2015

(51) Int. Cl.
| B01D 53/50 | (2006.01) |
| B01D 53/56 | (2006.01) |
| B01D 53/64 | (2006.01) |
| B01D 53/75 | (2006.01) |

(Continued)

(52) U.S. Cl.
CPC ............... *B01D 53/64* (2013.01); *B01D 53/60* (2013.01); *B01D 53/75* (2013.01); *B01D 53/8625* (2013.01); *B01D 53/50* (2013.01); *B01D 53/56* (2013.01); *B01D 2251/2062* (2013.01); *B01D 2253/102* (2013.01); *B01D 2257/602* (2013.01); *B01D 2258/0283* (2013.01)

(58) Field of Classification Search
CPC ........ B01D 53/50; B01D 53/56; B01D 53/64; B01D 53/75
See application file for complete search history.

(56) References Cited

U.S. PATENT DOCUMENTS

| 7,501,104 B2 * | 3/2009 | Obayashi | ............... B01D 53/64 422/105 |
| 8,071,060 B2 * | 12/2011 | Ukai | ................... B01D 53/501 422/168 |
| 8,449,851 B2 * | 5/2013 | Naito | ..................... B01D 53/64 422/105 |

(Continued)

FOREIGN PATENT DOCUMENTS

| JP | 2009-166012 A | 7/2009 |
| JP | 2012-011317 A | 1/2012 |
| WO | 2008/078721 A1 | 7/2008 |

OTHER PUBLICATIONS

Written Opinion dated Aug. 28, 2012, issued in corresponding application No. PCT/JP2012/064183, w/ English Translation. (4pages).

(Continued)

*Primary Examiner* — Timothy Vanoy
(74) *Attorney, Agent, or Firm* — Westerman, Hattori, Daniels & Adrian, LLP

(57) ABSTRACT

A system for treating mercury in flue gas is provided. The system includes a mercury adsorbent supply device to adsorb the mercury with the mercury adsorbent; a precipitator to collect the mercury adsorbent with adsorbed mercury and soot in the flue gas; a mercury adsorption assistant supply device to remove mercury remaining in the flue gas; and a desulfurization device to remove sulfur oxide (SOx) in the flue gas.

2 Claims, 15 Drawing Sheets

(51) Int. Cl.
  *B01D 53/60* (2006.01)
  *B01D 53/86* (2006.01)

(56) References Cited

U.S. PATENT DOCUMENTS

2010/0071348 A1   3/2010   Kobayashi et al.
2010/0074817 A1*  3/2010   Kobayashi ............ B01D 53/346
                                               423/239.1
2011/0076216 A1*  3/2011   Orita ..................... B01D 53/75
                                               423/242.1
2014/0308191 A1* 10/2014   Mazyck ................. B01D 53/64
                                               423/242.1

OTHER PUBLICATIONS

International Search Report dated Aug. 28, 2014, issued in corresponding application No. PCT/JP2012/064183.

Written Opinion dated Aug. 28, 2014, issued in corresponding application No. PCT/JP2012/064183.

* cited by examiner

SYSTEM AND METHOD FOR TREATING MERCURY IN FLUE GAS

FIELD

The present invention relates to a system and method for treating mercury in flue gas capable of removing mercury in the flue gas to a low concentration.

BACKGROUND

In the coal combustion flue gas or the flue gas produced when combusting heavy oil, mercury is contained, in addition to soot, sulfur oxide (SOx), and nitrogen oxide (NOx).

Since the mercury is a toxic substance, mercury content in the flue gas discharged from the stack has been regulated.

For this reason, from the related art, as a method of removing mercury, a technique for blowing powdered activated carbon into the flue gas and recovering mercury by a recovery unit such as a bag filter has been proposed (Patent Literature 1).

CITATION LIST

Patent Literature

Patent Literature 1: JP 2009-166012 A

SUMMARY

Technical Problem

In the proposal of the related art, for example, in a case where mercury in the flue gas is 10 µg/m³·N, when removing the mercury using the activated carbon, it has been possible to remove mercury to approximately 1 µg/m³·N, but it has been difficult to remove mercury to the further extent.

Incidentally, in December 2011, the United States Environmental Protection Agency (EPA) has announced Mercury and Air Toxics Standards (MATS).

According to this announcement, in the future (2015), regulations on the mercury content in the flue gas (mercury emissions regulation (MATS)) become stricter in the United States, specifically, there is a need to keep down mercury in the flue gas discharged from the stack to 0.00021 b/GWh, and when mercury in the flue gas is, for example, 10 µg/Nm³, there is a need to remove it to 0.003 µg/Nm³.

The invention has been made in view of the above, and an object thereof is to provide a system and method for treating mercury in the flue gas capable of coping with the strict regulation on mercury in the flue gas in the future.

Solution to Problem

According to a first aspect of the present invention in order to solve the problems, there is a provided a system for treating mercury in flue gas that removes mercury contained in the flue gas from a boiler, including: a denitration device that denitrates nitrogen oxide (NOx) in the flue gas from the boiler; an air heater that is provided on a downstream side of the denitration device to adjust a flue gas temperature; a desulfurization device that is provided on a downstream side of the air heater to remove sulfur oxide (SOx) in the flue gas; a mercury adsorbent supply device that is provided at either the front or back of the desulfurization device to supply a mercury adsorbent into the flue gas; and a precipitator that collects the mercury adsorbent with adsorbed mercury in the flue gas and soot.

According to a second aspect of the present invention, there is provided the system for treating mercury in flue gas according to the first aspect, further including: a mercury adsorption assistant supply device that supplies a mercury adsorption assistant into the flue gas on a downstream side of the desulfurization device.

According to a third aspect of the present invention, there is provided the system for treating mercury in flue gas according to the first or second aspect, wherein a reduction-oxidation assistant is supplied to the flue gas on a front side of the denitration device.

According to a third aspect of the present invention, there is provided the system for treating mercury in flue gas according to any one of the first to third aspects, wherein two or more precipitators are provided, and the mercury adsorbent is supplied to the flue gas on a front side after the second precipitator.

According to a fourth aspect of the present invention, there is provided a method for treating mercury in flue gas including: a denitration step of removing nitrogen oxide (NOx) in flue gas from a boiler; a temperature adjustment step of adjusting a gas temperature of the flue gas in contact with a denitration catalyst through heat exchange with air; a desulfurization step of removing sulfur oxide (SOx) in the flue gas; a mercury adsorbent supply step of supplying a mercury adsorbent into the flue gas either before or after the desulfurization step; and a collecting step of collecting the mercury adsorbent with adsorbed mercury in the flue gas by the mercury adsorbent and soot by the precipitator.

According to a fifth aspect of the present invention, there is provided the method for treating mercury in flue gas according to the fifth aspect, further including: a mercury adsorption assistant supplying step of supplying a mercury adsorption assistant into the flue gas on a downstream side of the desulfurization step.

According to a sixth aspect of the present invention, there is provided the method for treating mercury in flue gas according to the fifth or sixth aspect, wherein a denitration assistant is supplied to the flue gas on a front side of the denitration device.

According to a seventh aspect of the present invention, there is provided The method for treating mercury in flue gas according to any one of the fifth to seventh aspects, wherein two or more precipitators are provided, and the mercury adsorbent is supplied to the flue gas on a front side after the second precipitator.

Advantageous Effects of Invention

In accordance with the system and method for treating mercury in the flue gas according to the invention, there is an effect in which, in order to remove mercury in the flue gas, a heat exchanger is provided on a front side of a precipitator to lower the temperature of the flue gas and flocculate and remove $SO_3$ in the flue gas, and then by adding the mercury adsorbent, for example, activated carbon or the like to the flue gas, mercury in the flue gas can be absorbed and removed by the mercury adsorbent.

DESCRIPTION OF EMBODIMENTS

Hereinafter, preferred examples of the invention will be described in detail with reference to the accompanying drawings. In addition, the invention is not intended to be limited to the examples, and when there is a plurality of examples, an example configured by combining each example is also included.

First Example

Figure 1:
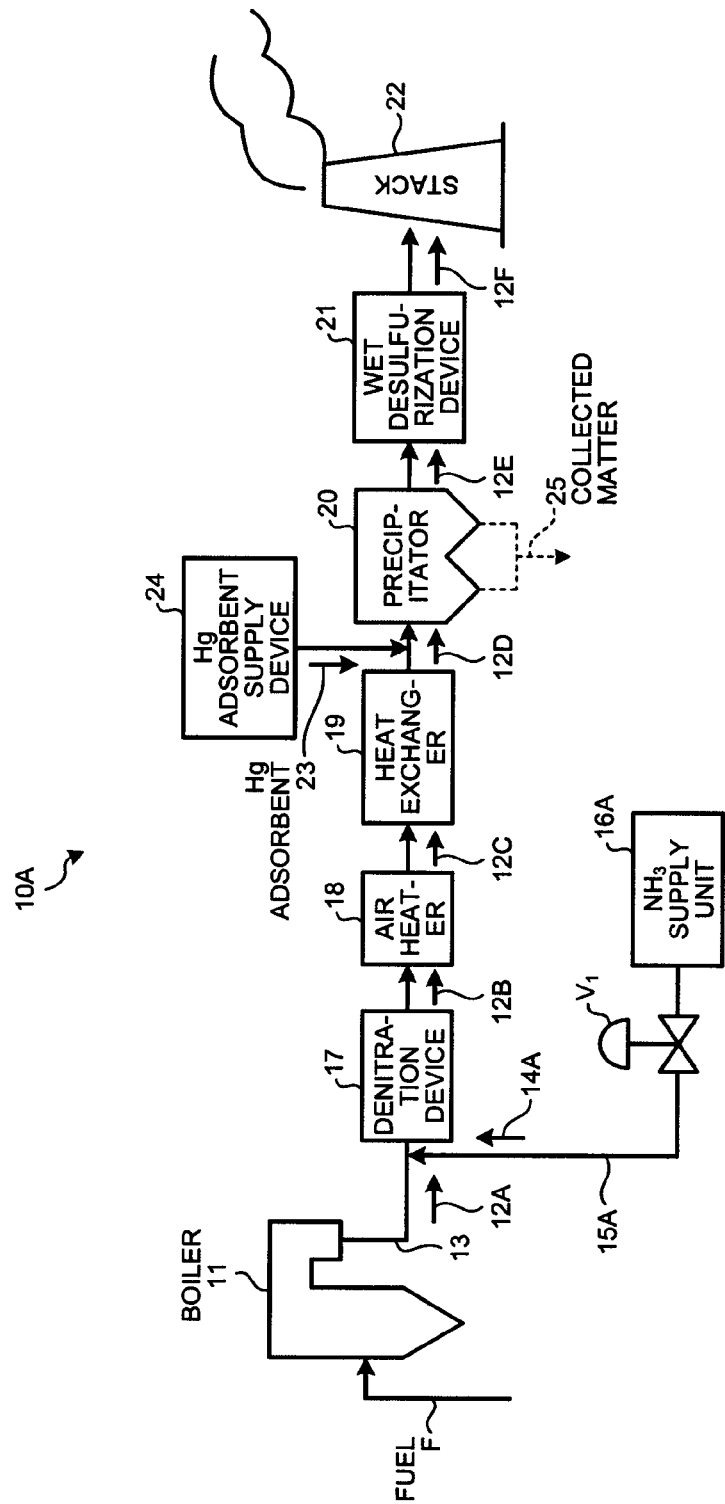
FIG. 1 is a schematic diagram illustrating a system for treating mercury in flue gas according to a first example of the invention.

FIG. 1 is a schematic diagram of a system for treating mercury in flue gas according to the first example of the invention.

As illustrated in FIG. 1, a system 10A for treating mercury in the flue gas according to this example is a system for treating mercury in the flue gas configured to remove mercury contained in flue gas 12A from a boiler 11. The system has a denitration device 17 that denitrates nitrogen oxide (NOx) in the flue gas 12A from the boiler 11 supplied with fuel F and boiler-combusted, an air heater 18 provided on a downstream side of the denitration device 17 to adjust the flue gas temperature, a heat exchanger 19 provided on the downstream side of the air heater 18 to further lower the flue gas subjected to temperature adjustment, a mercury (Hg) adsorbent supply device 24 that supplies a mercury (Hg) adsorbent 23 to the flue gas 12D of which the temperature is lowered by the heat exchanger 19, a precipitator 20 that collects the mercury adsorbent 23 with adsorbed mercury in the flue gas 12D and soot, and a wet desulfurization device 21 that removes sulfur oxide (SOx) in the flue gas 12E from which the soot and the mercury adsorbent 23 are removed by the precipitator 20.

Here, in FIG. 1, reference numeral 13 illustrates a flue gas duct through which the flue gas is discharged, reference numeral 22 illustrates a stack that discharges the purified flue gas to the outside, and reference numeral V1 illustrates a supply amount adjusting valve.

In this example, on the front side of the denitration device 17, ammonia ($NH_3$) 14A as a denitration assistant is supplied into the flue gas flowing through the flue gas duct 13 from an ammonia ($NH_3$) supply unit 16A via an ammonia ($NH_3$) supply line 15A to perform the reduction denitration by ammonia 14A.

As the denitration device 17, it is possible to use a general device having a reduction denitration catalyst. The reduction denitration catalyst is not particularly limited, but for example, it is possible to use one obtained by supporting a metal oxide of W, Sn, In, Co, Ni, Fe, Ni, Ag, Cu or the like on a support such as zeolite. An amount of the reduction denitration catalyst included in the denitration device 16A may be greater than a normal amount to enhance mercury oxidation efficiency.

The gas temperature of the flue gas 12B subjected to the ammonia-denitration is, for example, approximately 330° C., air (not illustrated) separately supplied to the boiler 11 from the outside is preheated by an air heater (AH) 18 using heat of the flue gas 12B.

In this example, the gas temperature of the flue gas 12C after passing through the air heater (AH) 18 is further lowered to 90° C. using a heat exchanger 19. Here, the heat exchange points using the heat exchanger 19 are heating of the boiler feed water, heating of air before being introduced into the air heater 18 and the like.

As a result of this temperature drop, the temperature becomes equal to or less than an acid dew point (100° C.) of sulfurous acid, and the sulfurous acid ($SO_3$) gas present in the flue gas 12C flocculates. As a result of the flocculation, sulfurous acid adheres to the soot present in the flue gas 12C.

By the adhesion, the ratio of sulfurous acid gas in the flue gas 12C decreases.

The mercury adsorbent 23 is introduced into the flue gas 12D having a lower temperature after passing through the heat exchanger 19 by the mercury adsorbent supply device 24 to adsorb and remove mercury existing in the flue gas 12C.

In this example, the activated carbon is used as the mercury adsorbent 23, but the invention is not limited thereto, and as long as adsorbents such as fly ash, zeolite, and charcoal cutting product can efficiently adsorb mercury, any adsorbent may be used.

Here, in this example, since the flue gas temperature is lowered to approximately 90° C. at the front stage of introduction of the mercury adsorbent 23, the amount of sulfurous acid gas in the flue gas decreases to improve the mercury adsorption performance of the activated carbon.

Figure 15:
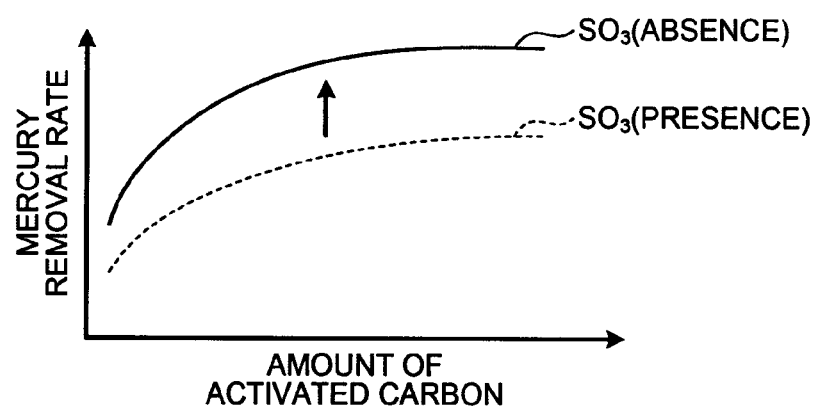
FIG. 15 is a graph illustrating a relation between an amount of activated carbon supplied into the flue gas and a mercury removal rate depending on the presence or absence of $SO_3$.

FIG. 15 illustrates a diagram of relation between an amount of activated carbon supplied into the flue gas and the mercury removal rate depending on the presence or absence of $SO_3$. As illustrated in FIG. 15, compared to a case where $SO_3$ is present in the flue gas ($SO_3$ presence), in a case where $SO_3$ is not present in the flue gas (SO$_3$ absence), the mercury removal rate when adsorbing mercury by the activated carbon is improved.

This is due to the fact that, when the sulfurous acid gas is present in the flue gas, the activated carbon for collecting mercury adsorbs the sulfurous acid gas, the activated carbon is deactivated before adsorbing mercury, and thus, it is not possible to adsorb mercury.

In this example, since the gas temperature is lowered to the acid dew point (100° C.) of sulfurous acid or lower, the amount of sulfurous acid gas that inactivates mercury decreases, and thus, the mercury adsorption performance of the activated carbon is improved.

The mercury adsorbent 23 with adsorbed mercury, and the soot in the flue gas 12D are collected by the precipitator 20.

As the precipitator 20, it is possible to use, for example, known dust removal units such as an electrostatic precipitator (ESP), and bag filters (BF, FF). In addition, collected matters 25 containing the collected mercury adsorbent 23 are separately discarded.

As the flue gas 12E from which the dust is removed by the precipitator 20 passes through a wet desulfurization device 21, sulfur oxide and mercury oxides such as mercury chloride present in the gas are absorbed and removed.

As the wet desulfurization device 21, it is possible to use the devices of the related art provided with an alkaline absorbent. As the alkaline absorbent, for example, it is possible to use an aqueous solution such as calcium carbonate, calcium hydroxide, sodium hydroxide, sodium sulfite, and ammonia, magnesium hydroxide, but the alkaline absorbent is not limited thereto.

The wet desulfurization device 21 is preferably further provided with a mercury re-scattering prevention device (not illustrated). The mercury re-scattering prevention device is a device that keeps an oxidation-reduction potential of the alkaline absorbent in a constant range, by supplying oxidizing agent or air to the alkaline absorbent. As in Formula (1), the mercury re-scattering prevention device prevents mercury oxide (Hg$^{2+}$) in the absorbent from being reduced to metallic mercury (Hg$^0$) by SO$_2$ or the like and prevents mercury from scattering again.

$$Hg^{2+} + 2e^- \Leftrightarrow Hg^0 \qquad (1)$$

Preferably, the mercury re-scattering prevention device is a device that is capable of adjusting oxidation-reduction potential (ORP) of the absorbent, for example, to 600 mV or less. At the rear stage of the wet desulfurization device 21, a belt filter (not illustrated) is installed to dehydrate and collect gypsum slurry generated in an absorber of the wet desulfurization device 21, and to discharge, for example, solid gypsum.

Thereafter, the purified flue gas 12F is discharged to the outside from the stack 22.

Next, an embodiment of a method for removing mercury in the flue gas by the mercury treating system will be described. The present method for removing mercury includes a step of supplying ammonia 14A into the flue gas 12A from the boiler 11, a denitration step of bringing the flue gas 12A supplied with ammonia into contact with the denitration catalyst to remove nitrogen oxide (NOx) in the flue gas 12A, a temperature adjustment step of adjusting the gas temperature of the flue gas 12B in contact with the denitration catalyst to 130° C. through heat exchange with air, a temperature drop step of lowering the temperature of the temperature-regulated flue gas 12C to 90° C. or lower by the heat exchanger 19, a mercury adsorbent supplying step of supplying the mercury adsorbent 23 into the temperature-lowered flue gas 12D, a collecting step of collecting the mercury adsorbent with adsorbed mercury in the flue gas 12D by the mercury adsorbent 23 and the soot by the precipitator 20, and a wet desulfurization step of removing sulfur oxide (SOx) in the flue gas 12E from which the dust is removed.

According to the method for removing mercury in the flue gas according to the invention, in order to remove mercury in the flue gas, a heat exchanger 19 is provided on the front side of the precipitator 20 to lower the temperature of the flue gas 12C. Thus, the temperature of the flue gas 12C is lowered to flocculate and remove SO$_3$ in the gas, thereby reducing the amount of SO$_3$. In a state in which the amount of SO$_3$ in the gas is lowered, by adding the mercury adsorbent 23 such as activated carbon to the flue gas 12D, it is possible to adsorb and remove mercury in the flue gas 12D by the mercury adsorbent 23. Furthermore, in the wet desulfurization device 21, scattering of zero-valent mercury remaining in the flue gas 12E is prevented.

According to the system for treating mercury in flue gas according to the invention, it is possible to remove mercury in the flue gas preferably at a mercury removal rate of 98% or higher. The mercury removal rate is more preferably 99% or higher.

Second Example

Next, the system for treating mercury in flue gas according to a second example of the invention will be described. In addition, the same constituent elements as in the first example are denoted by the same reference numerals, and the repeated description will not be provided.

Figure 2:
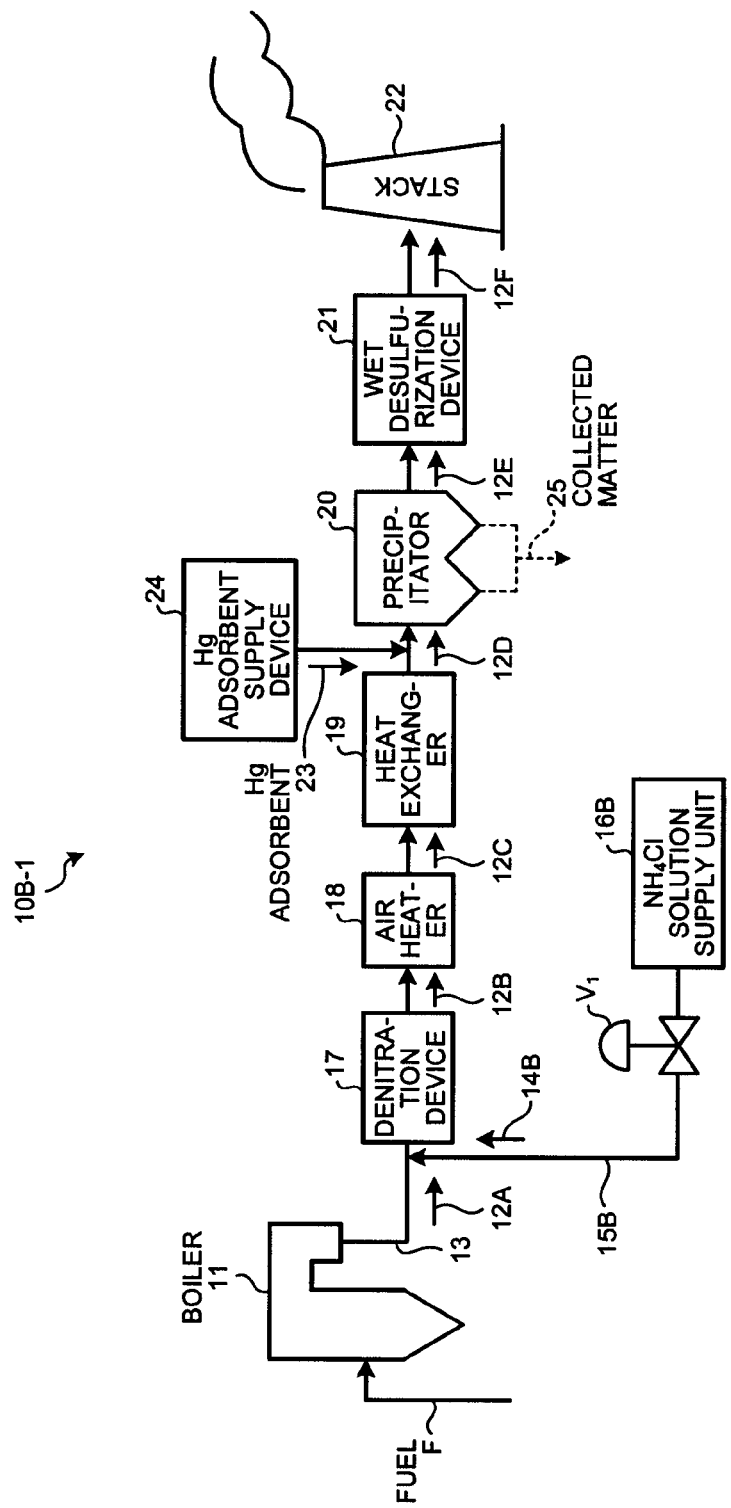
FIG. 2 is a schematic diagram illustrating a system for treating mercury in flue gas according to a second example of the invention.

FIG. 2 is a schematic diagram of a system for treating mercury in flue gas according to the second example of the invention.

As illustrated in FIG. 2, a system 10B-1 for treating mercury in the flue gas according to this example supplies ammonium chloride, in place of the ammonia used in the first example.

This example has an ammonium chloride (NH$_4$Cl) solution supply unit 16B that sprays NH$_4$Cl solution 14B containing ammonium chloride (NH$_4$Cl) as the reduction-oxidation assistant into the flue gas duct 13 on the downstream of the boiler 11, and a denitration device 17 having a denitration catalyst that reduces NOx in the flue gas 12A by the NH$_3$ gas and oxidizes metallic mercury (Hg$^0$) under coexistence of HCl gas.

In this example, NH$_4$Cl is used as an example, but this example is not limited thereto, and as long as the reduction-oxidation assistant is a halide that generates the oxidation assistant and the reduction assistant when vaporized, any substance can be used. Here, in this example, the reduction-oxidation assistant refers to one that functions as the oxidation assistant used for oxidizing metallic mercury (Hg$^0$) under coexistence of oxidation assistant, and a reducing agent that reduces NOx by the reduction assistant. In this example, HCl gas is used as the oxidation assistant, and NH$_3$ gas is used as the reduction assistant.

In addition, the oxidation assistant (for example, HCl gas) and the reduction assistant (for example, NH$_3$ gas) may also be separately introduced.

The NH$_4$Cl solution 14B is supplied to the flue gas 12A discharged from the boiler 11 via an ammonium chloride (NH$_4$Cl) supply line 15B from the NH$_4$Cl solution supply unit 16B.

The droplets of the NH$_4$Cl solution 14B sprayed into the flue gas duct 13 from the NH$_4$Cl solution supply unit 16B is vaporized by evaporation due to the high-temperature atmosphere temperature of the flue gas 12A to generate fine solid particles of NH$_4$Cl and is decomposed into HCl and NH$_3$ as in the following Formula (2). Thus, the NH$_4$Cl solution 14B sprayed from the spray unit is decomposed to generate HCl and NH$_3$, and supplies the NH$_3$ gas and HCl gas into the flue gas duct 13.

$$NH_4Cl \rightarrow NH_3 + HCl \quad (2)$$

The temperature of the flue gas 12A in the flue gas duct 13 depends on the combustion conditions of the boiler 11, but for example, the temperature is preferably 320° C. or higher and 420° C. or lower, and more preferably is 320° C. or higher and 380° C. or lower. The reason is that it is possible to efficiently generate the denitration reaction of NOx and the oxidation reaction of Hg on the denitration catalyst in this temperature zone.

Furthermore, after containing the HCl gas and the NH$_3$ gas generated from the droplets of NH$_4$Cl solution 14B sprayed into the flue gas duct 13 from the NH$_4$Cl solution supply unit 16B, the flue gas 12A is supplied to the denitration device 17. In the denitration device 17, since the NH$_3$ gas generated by the decomposition of NH$_4$Cl is used for the reduction denitration of NOx, and the HCl gas is used for oxidation of Hg to remove NOx and Hg from the flue gas 12, the mercury removal rate is improved compared to the case of using ammonia.

That is, the NH$_3$ gas on the denitration catalyst filled in the denitration catalyst layer filled in the denitration device 17 reduces and denitrates NOx as in the following Formula (3), and Hg is oxidized by the HCl gas as in the following Formula (4).

$$4NO + 4NH_3 + O_2 \rightarrow 4N_2 + 6H_2O \quad (3)$$

$$Hg + \tfrac{1}{2}O_2 + 2HCl \rightarrow HgCl_2 + H_2O \quad (4)$$

After the reduction of NOx and the oxidation of Hg in the flue gas 12A are performed in the denitration device 17, the temperature of the flue gas 12D is lowered by the air heater 18 and the heat exchanger 19, and the mercury adsorbent 23 such as activated carbon is added to the flue gas 12 to adsorb and remove mercury in the flue gas 12D. The mercury adsorbent 23 with adsorbed mercury is collected in the precipitator 20.

Next, after the dust is removed by the precipitator 20, the flue gas 12E is sent to the wet desulfurization device 21 and is desulfurized.

In the wet desulfurization device 21, sulfur oxide (SO$_X$) in the flue gas 12E is collected, for example, in the form of gypsum CaSO$_4$.2H$_2$O.

At this time, since mercury chloride (HgCl$_2$) in the flue gas 12E is water-soluble, it is shifted to one side of the limestone gypsum slurry of the wet desulfurization device 21 and immobilized.

According to the system for treating mercury in flue gas according to the invention, the mercury removal performance is improved compared to the first example, and it is possible to remove mercury in the flue gas preferably at the mercury removal rate of 99% or higher. The mercury removal rate is more preferably 99.7% or higher.

Third Example

Next, the system for treating mercury in flue gas according to the third example of the invention will be described. In addition, the same constituent elements as in the second example are denoted by the same reference numerals and the repeated description will not be provided.

Figure 3:
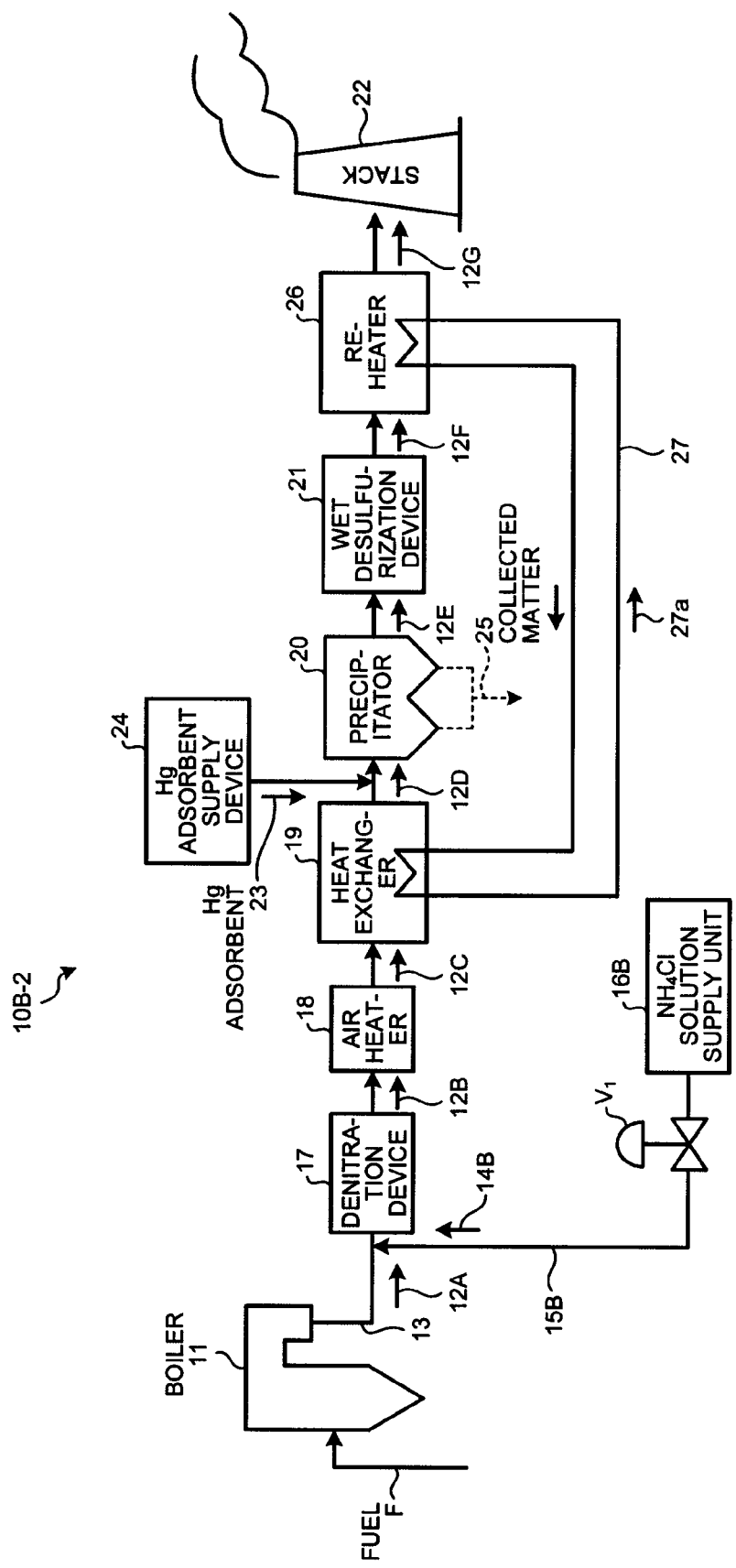
FIG. 3 is a schematic diagram illustrating a system for treating mercury in flue gas according to a third example of the invention.

FIG. 3 is a schematic diagram of a system for treating mercury in flue gas according to a third embodiment of the invention.

As illustrated in FIG. 3, in a system 10B-2 for treating mercury in the flue gas according to this example, in order to heat the flue gas 12G before being discharged from the stack 22 by the heat recovered by the heat exchanger 19, and a re-heater 26 is interposed in the flue gas duct 13 in the system 10B-1 for treating mercury in flue gas of the second example.

The gas temperature of the flue gas 12F is raised to approximately 90 to 100° C. from 50° C. by the re-heater 26 using the heat 27a recovered by the heat exchanger 19. This prevents white smoke (visualization) when the flue gas 12G having the raised temperature is discharged from the stack 22. In FIG. 3, reference numeral 27 illustrates a heat recovery line.

Fourth Example

Next, A system for treating mercury in flue gas according to a fourth example of the invention will be described. In addition, the same constituent elements as in the second example are denoted by the same reference numerals, and the repeated description will not be provided.

Figure 4:
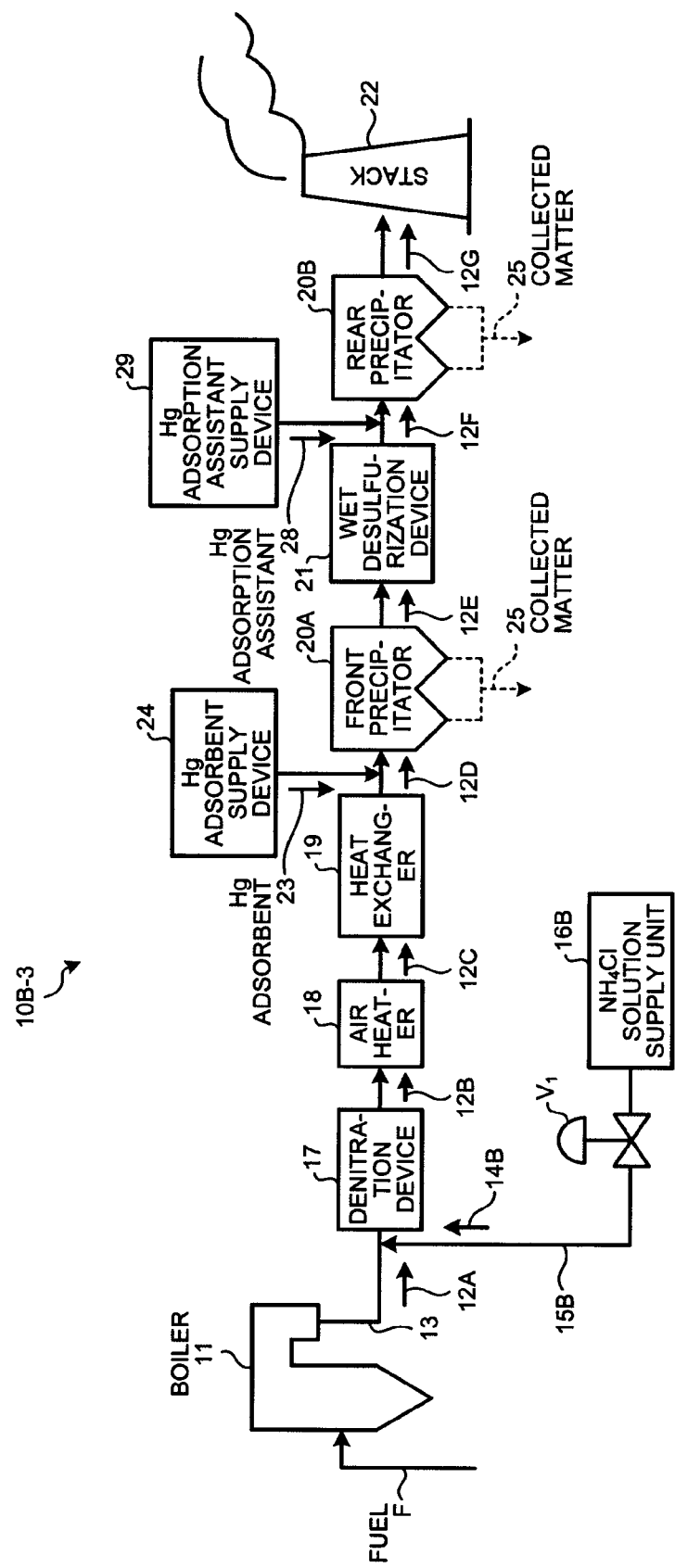
FIG. 4 is a schematic diagram illustrating a system for treating mercury in flue gas according to a fourth example of the invention.

FIG. 4 is a schematic diagram of a system for treating mercury in flue gas according to the fourth example of the invention.

As illustrated in FIG. 4, a system 10B-3 for treating mercury in flue gas according to this example has a mercury (Hg) adsorbent supply device 24 that supplies the mercury (Hg) adsorbent 23 into the flue gas 12D that is lowered in temperature by the heat exchanger 19, a front precipitator 20A that collects the mercury adsorbent 23 with adsorbed mercury in the flue gas 12D and the soot, a wet desulfurization device 21 that removes sulfur oxide (SOx) in the flue gas 12E from which the soot and the mercury adsorbent 23 are removed by the precipitator 20A, a mercury (Hg) adsorption assistant supply device 29 that is provided on the downstream side of the wet desulfurization device 21 to supply the mercury (Hg) adsorption assistant 28 to the flue gas 12D, and a rear precipitator 20B that collects the mercury adsorbent 23 with adsorbed mercury in the flue gas 12D and the soot in a mercury processing system 10B-1 in the flue gas of the second example.

In this example, mercury remaining in the flue gas 12F is also removed using the mercury adsorption assistant 28, on the downstream side of the wet desulfurization device 21.

Here, as the mercury adsorption assistant 28, it is possible to adopt for example, activated carbon, an oxidizing agent (for example, sodium hypochlorite, hydrogen peroxide or the like), a chelating resin material, ash or the like.

Further, as the rear precipitator 20B, a wet electrostatic precipitator, a wet scrubber, an adsorber or the like can be exemplified, and the collected matter 25 containing the collected mercury adsorption assistant are separately discarded.

According to this example, it is possible to remove the mercury that has not been able to be removed by the wet desulfurization device 21.

According to the system for treating mercury in flue gas according to the invention, the mercury removal performance is improved compared to the first and second examples, and it is possible to remove mercury in the flue gas preferably at the mercury removal rate of 99.5% or higher. The mercury removal rate is more preferably 99.9% or higher.

Fifth Example

Next, a system for treating mercury in flue gas according to a fifth example of the invention will be described. In addition, the same constituent elements as in the fourth example are FIG. 5 is a schematic diagram of a system for treating mercury in flue gas according to the fifth embodiment of the invention.

Figure 5:
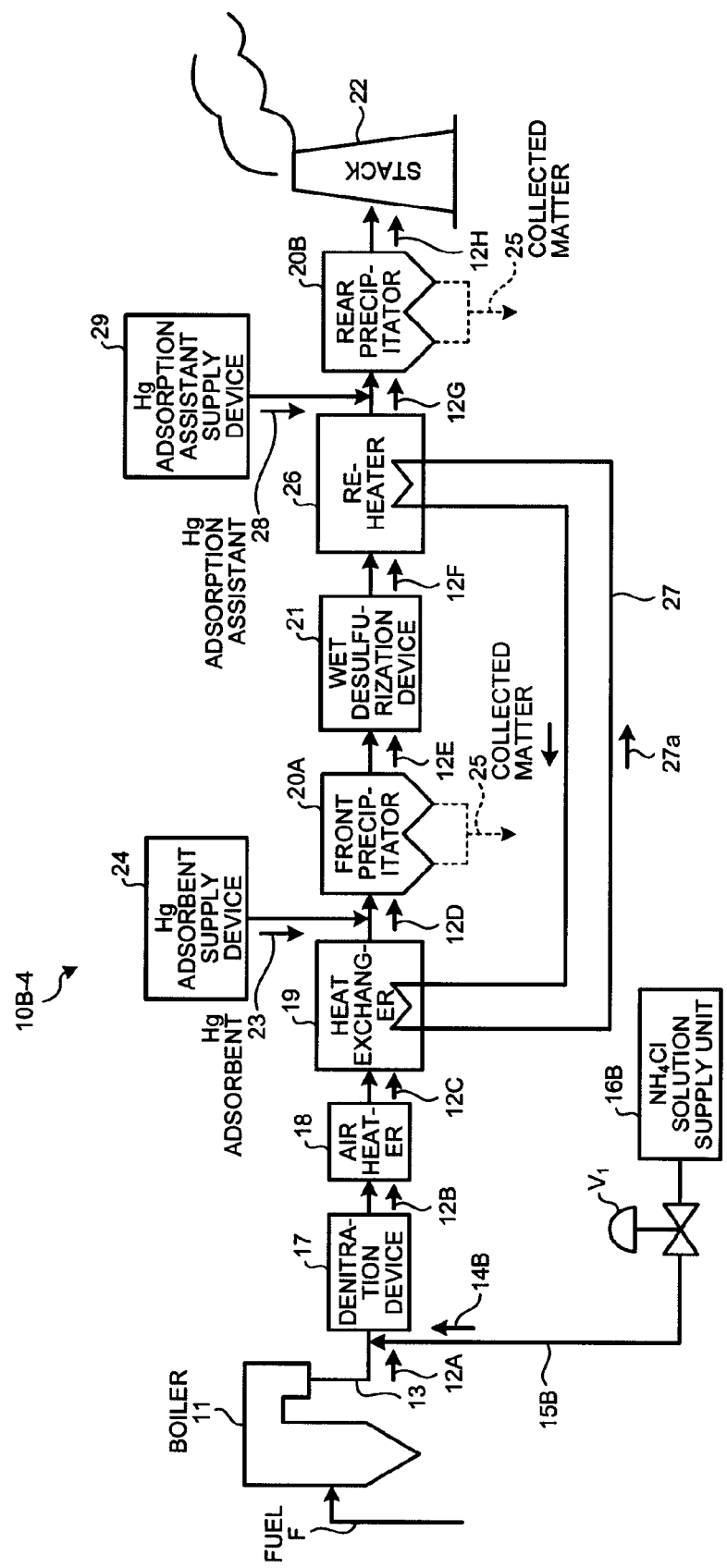
FIG. 5 is a schematic diagram illustrating a system for treating mercury in flue gas according to a fifth example of the invention.

As illustrated in FIG. 5, a system 10B-4 for treating mercury in flue gas according to this example is configured so that a re-heater 26 is interposed on the downstream side of the wet desulfurization device 21 to raise the temperature of the flue gas 12F in the system 10B-3 for treating mercury in flue gas of the fourth example.

Since the temperature of the flue gas 12F desulfurized by the wet desulfurization device 21 is approximately 50° C., the re-heater 26 is provided to heat the gas temperature, for example, to 90° C.

The mercury adsorption assistant 28 from the mercury adsorption assistant supply device 29 is supplied to the heated flue gas 12G, thereby adsorbing and removing mercury existing in the flue gas 12H.

The mercury adsorbent 23 with adsorbed mercury and the soot in the flue gas 12G are collected by the rear precipitator 20B.

Here, since the gas is dried by the re-heater 26, as the rear precipitator 20B, it is possible to exemplify an electrostatic precipitator, a dry bag filter (FF) or the like.

Thereafter, the purified flue gas 12H is discharged to the outside from the stack 22.

According to this example, the flue gas 12F containing mercury which has not been able to be removed in the wet desulfurization device 21 is heated by the re-heater 26, and the removal of mercury is performed by the mercury adsorption assistant 28 at a high gas temperature state.

Sixth Example

Next, a system for treating mercury in flue gas according to a sixth example of the invention will be described. In addition, the same constituent elements as in the second example are denoted by the same reference numerals, and the repeated description will not be provided.

Figure 6:
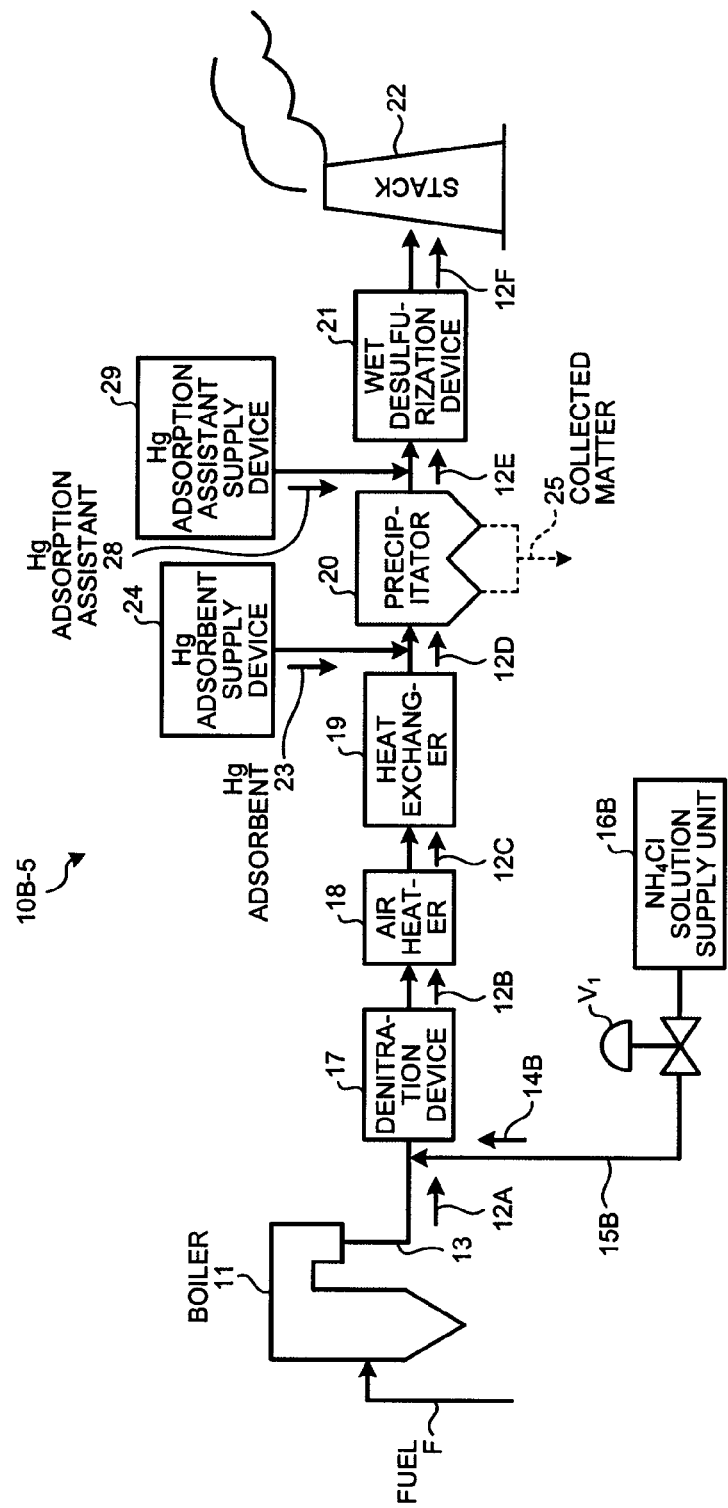
FIG. 6 is a schematic diagram illustrating a system for treating mercury in flue gas according to a sixth example of the invention.

FIG. 6 is a schematic diagram of the system for treating mercury in flue gas according to the sixth example of the invention.

As illustrated in FIG. 6, in a system 10B-5 for treating mercury in flue gas according to this example, on the upstream side of the wet desulfurization device 21 of the system 10B-1 for treating mercury in the flue gas of the second example, the mercury adsorption assistant 28 from the mercury adsorption assistant supply device 29 is supplied to the flue gas 12E to adsorb and remove mercury existing in the flue gas 12E and is introduced into the wet desulfurization device 21.

In the wet desulfurization device 21, calcium hydroxide is supplied as an alkaline absorbent, and desulfurization is performed as limestone and gypsum. At this time, for example, by supplying the activated carbon as the mercury adsorption assistant 28 into the flue gas 12E before being introduced into the wet desulfurization device 21, mercury in the flue gas is removed. Moreover, the supplied activated carbon is introduced into the wet desulfurization device 21 while adsorbing mercury, and is discharged to the outside, together with the gypsum.

Figure 7:
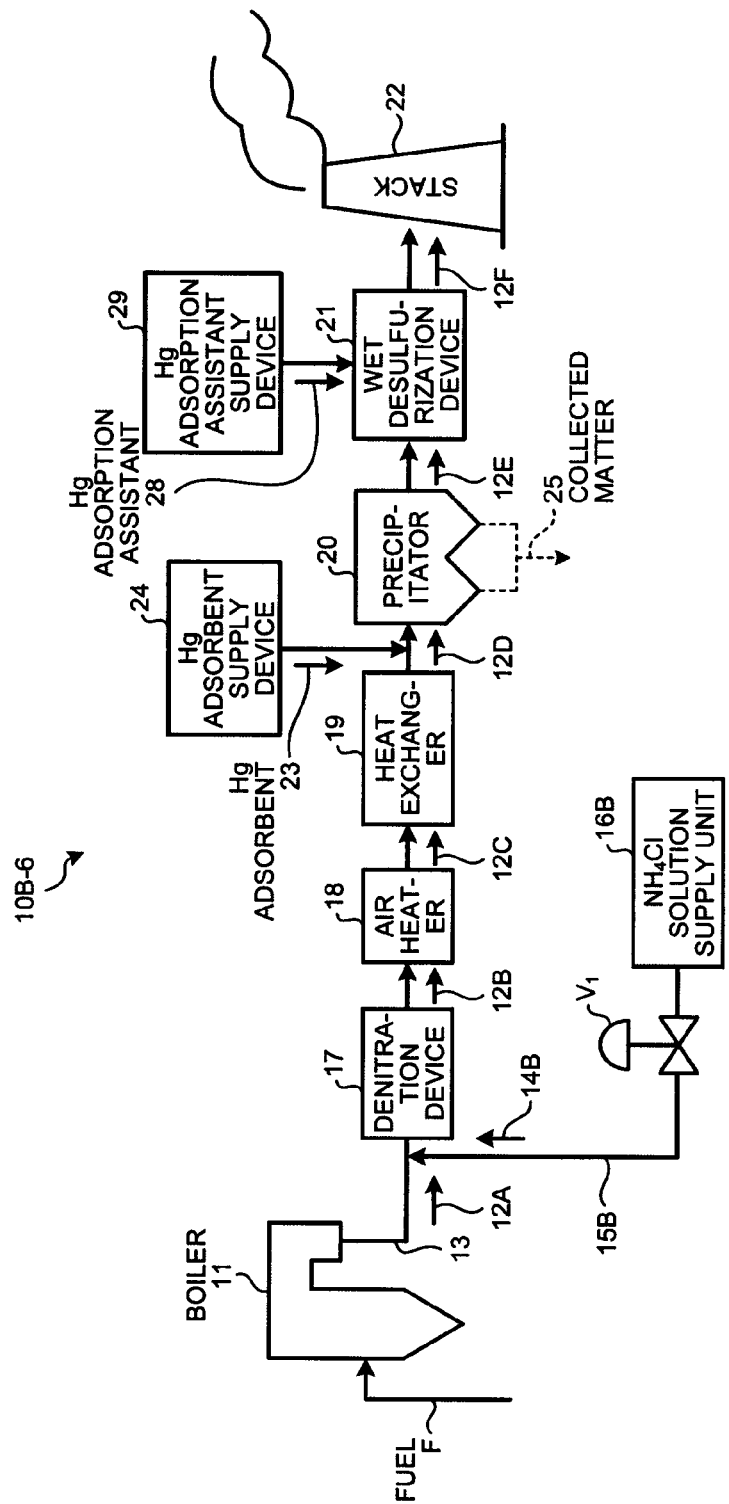
FIG. 7 is a schematic diagram illustrating another system for treating mercury in flue gas according to the sixth example of the invention.
Figure 8:
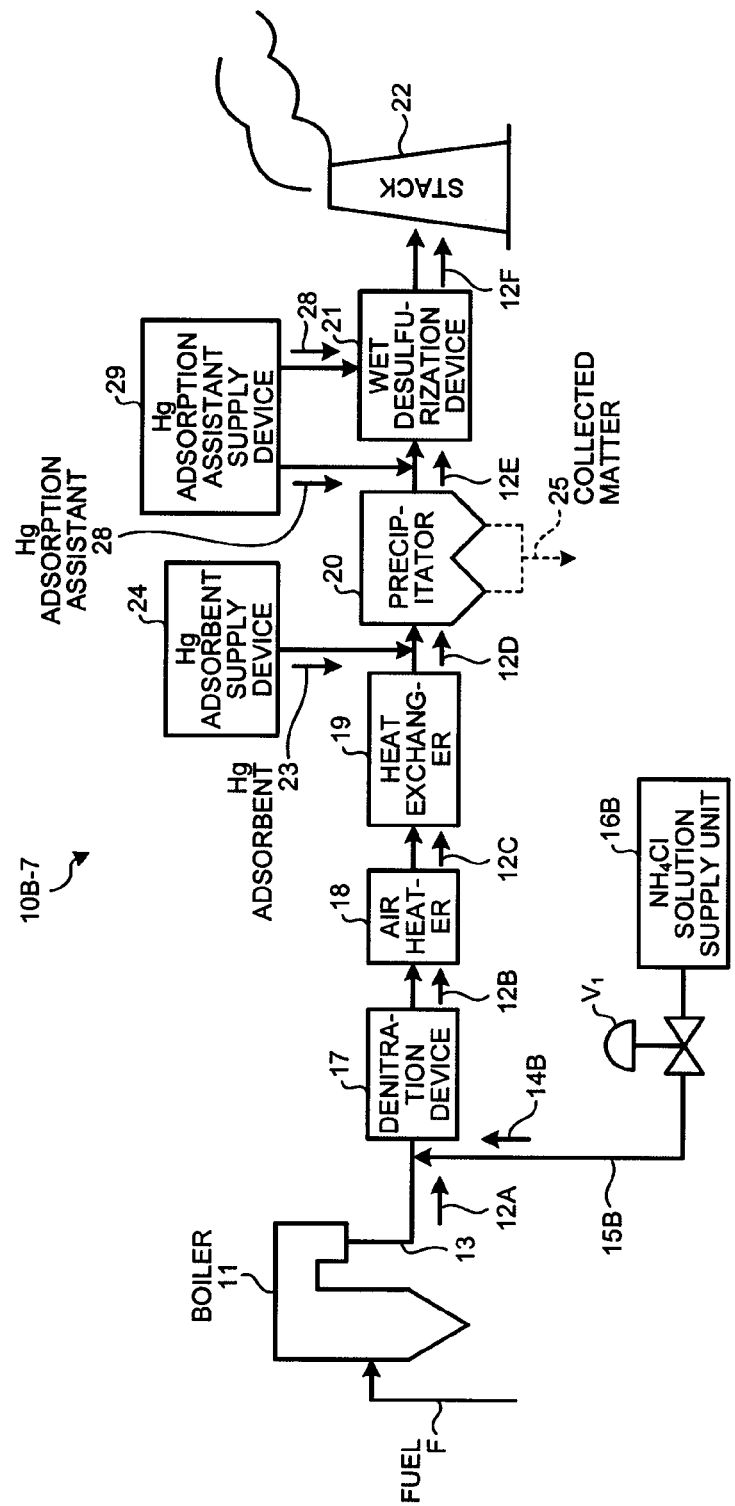
FIG. 8 is a schematic diagram illustrating still another system for treating mercury in flue gas according to the sixth example of the invention.

Furthermore, FIGS. 7 and 8 are schematic diagrams of another system for treating mercury in flue gas according to the sixth example of the invention.

In a system 10B-6 for treating mercury in flue gas according to this example of FIG. 7, the mercury adsorption assistant 28 from the mercury adsorption assistant supply device 29 is supplied to an alkaline absorbent side of the interior of the wet desulfurization device 21 in the system 10B-1 for treating mercury in flue gas of the second example, thereby adsorbing and removing mercury existing in the flue gas 12E.

In a system 10B-7 for treating mercury in flue gas according to this example of FIG. 8, on the upstream side of the wet desulfurization device 21 in the system 10B-1 for treating mercury in flue gas of the second example, the mercury adsorption assistant 28 from the mercury adsorption assistant supply device 29 is supplied to the flue gas 12E to adsorb and remove mercury existing in the flue gas 12E and is introduced into the wet desulfurization device 21. Furthermore, the mercury adsorption assistant 28 from the mercury adsorption assistant supply device 29 is supplied to the alkaline absorbent side of the interior of the wet desulfurization device 21, thereby further adsorbing and removing mercury existing in the flue gas 12E.

Seventh Example

Next, a system for treating mercury in flue gas according to a seventh example of the invention will be described. In addition, the same constituent elements as in the first and second examples are denoted by the same reference numerals, and the repeated description will not be provided.

Figure 9:
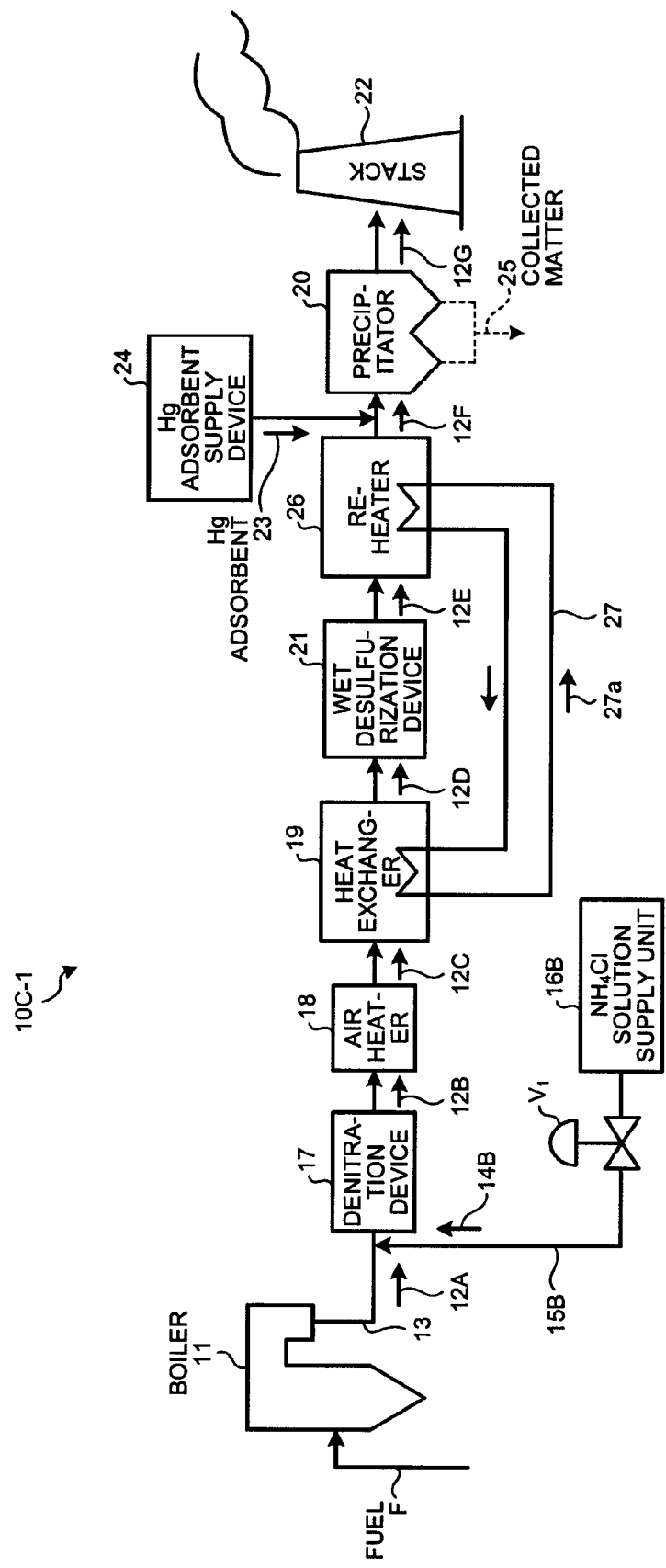
FIG. 9 is a schematic diagram of a system for treating mercury in flue gas according to a seventh example of the invention.

FIG. 9 is a schematic diagram of a system for treating mercury in flue gas according to the seventh embodiment of the invention.

As illustrated in FIG. 9, in a system 10C-1 for treating mercury in the flue gas according to this example, first, a wet desulfurization device 21 is provided on the downstream side of the heat exchanger 19 in the second example to remove the sulfur oxide in the flue gas 12D.

Since the temperature of the flue gas 12E desulfurized in the wet desulfurization device 21 is approximately 50° C., the re-heater 26 is provided to heat the gas temperature to, for example, approximately 90° C.

The mercury adsorbent 23 from the mercury adsorbent supply device 24 is supplied to the flue gas 12F heated to approximately 90° C. to adsorb and remove mercury existing in the flue gas 12F.

The mercury adsorbent 23 with adsorbed mercury and the soot in the flue gas 12F are collected by the precipitator 20.

Thereafter, the purified flue gas 12G is discharged to the outside from the stack 22.

In this example, by providing the re-heater 26, the heat 27a heat-recovered in the heat exchanger 19 is supplied via the heat recovery line 27, and thus, it is possible to raise the temperature of the flue gas 12F to approximately 90° C.

Here, the rise temperature of the flue gas 12F is higher by approximately 20° C. than the gas temperature (50° C.) of the flue gas 12E introduced into the re-heater 26, and becomes a temperature at which moisture in the flue gas 12H is not condensed.

Figure 10:
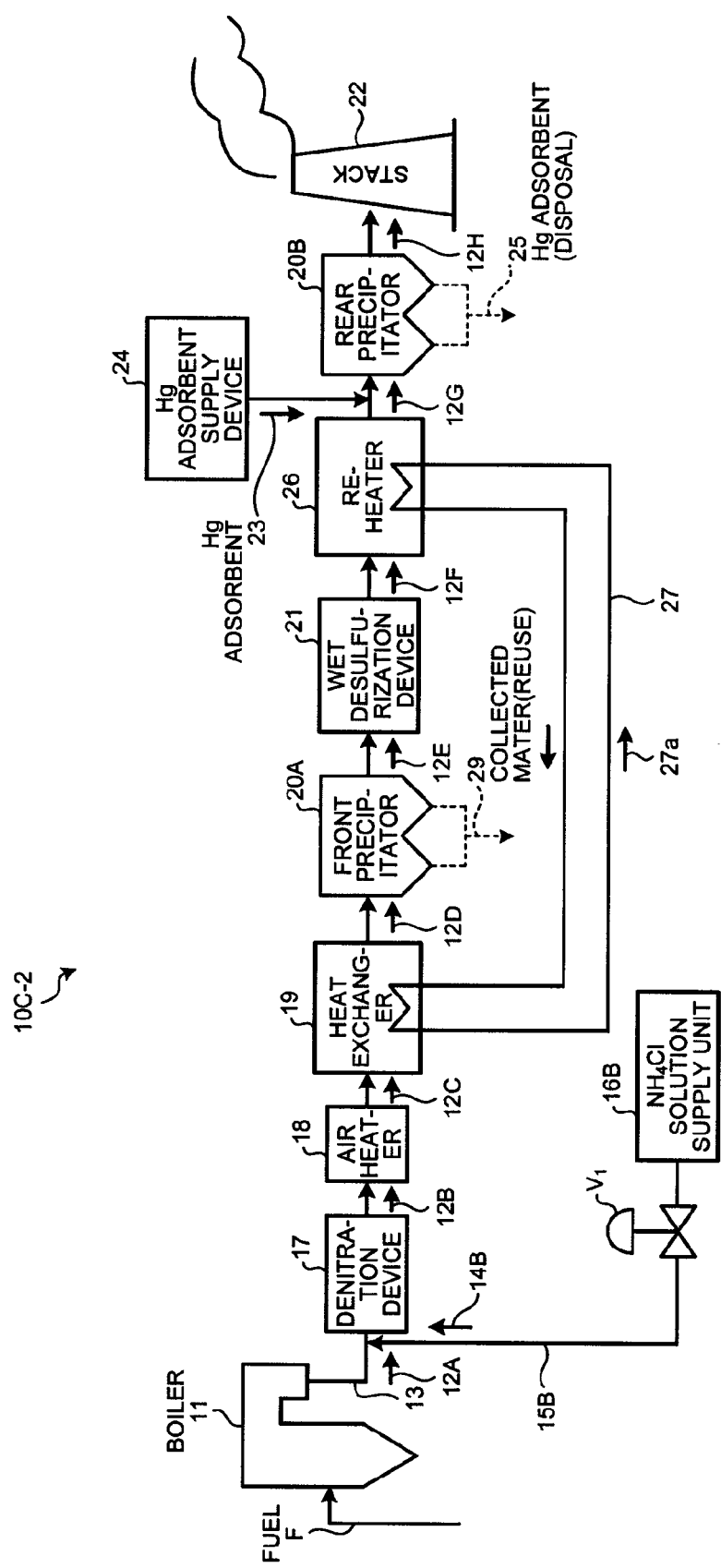
FIG. 10 is a schematic diagram illustrating another system for treating mercury in flue gas according to the seventh example of the invention.

In addition, FIG. 10 is a schematic diagram of another system for treating mercury in flue gas according to the seventh example of the invention.

In a system 10C-2 for treating mercury in the flue gas according to this example of FIG. 10, a front precipitator 20A is provided between the heat exchanger 19 and the wet desulfurization device 21 in the system 10C-1 for treating mercury in the flue gas of the ninth example. As a result, the soot in the flue gas is removed by the front precipitator 20A.

In this example, since only the soot in the flue gas 12D is collected by the front precipitator 20A and mercury is not adsorbed to the ejected collected matter 29, the ejected collected matter 29 can be reused.

Furthermore, since the mercury adsorbent 23 is supplied into the flue gas 12G in front of the rear precipitator 20B provided on the downstream side of the re-heater 26, mercury is adsorbed by the mercury adsorbent 23. The mercury adsorbent 23 with adsorbed mercury is ejected from the rear precipitator 20B and is separately discarded.

Thus, in this example, it is possible to recover and reuse the reusable collected matter (fly ash) 29 from the flue gas.

According to the system for treating mercury in flue gas according to the invention, the mercury removal performance is improved compared to the first example, and it is possible to remove the mercury in the flue gas, preferably at the mercury removal rate of 99% or higher similar to that of the second example. The mercury removal rate is more preferably 99.7% or higher.

Eighth Example

Next, a system for treating mercury in flue gas according to an eighth example of the invention will be described. In addition, the same constituent elements as in the first and second examples are denoted by the same reference numerals, and the repeated description will not be provided.

Figure 11:
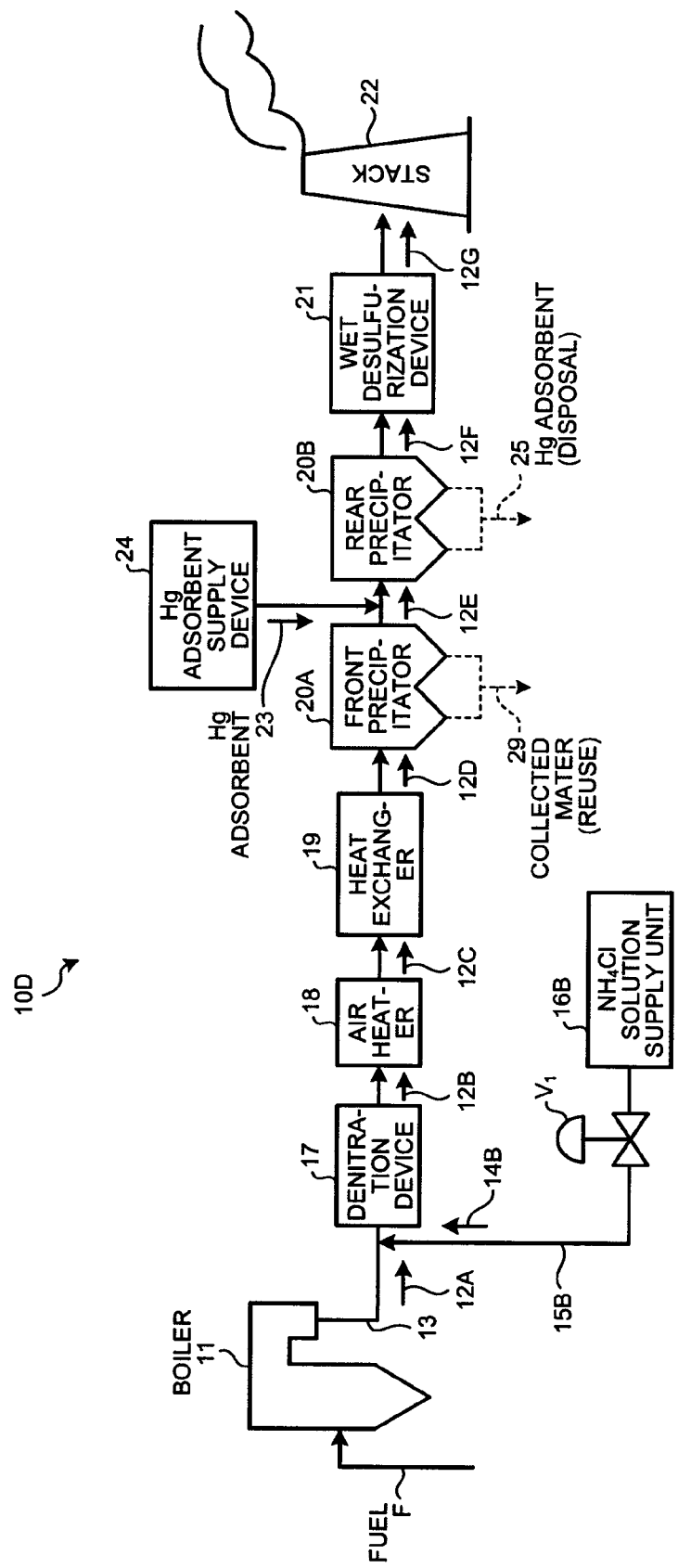
FIG. 11 is a schematic diagram of a system for treating mercury in flue gas according to an eighth example of the invention.

FIG. 11 is a schematic diagram of a system for treating mercury in flue gas according to the eighth embodiment of the invention.

As illustrated in FIG. 11, in a system 10D for treating mercury in the flue gas according to this example, at least two precipitators interposed between the heat exchanger 19 and the wet desulfurization device 21 in the second example are installed.

In this example, as illustrated in FIG. 11, two precipitators of a front precipitator 20A on the front side and a rear precipitator 20B on the rear side are installed.

Moreover, the mercury adsorbent 23 is supplied between the flue gas ducts 13 of the front precipitator 20A and the rear precipitator 20B.

Thus, since only the soot in the flue gas 12D is collected in the front precipitator 20A, and mercury is not adsorbed to the ejected collected matter 29, the ejected collected matter 29 can be reused.

Furthermore, since the mercury adsorbent 23 is supplied to the flue gas 12F in front of the rear precipitator 20B, mercury in the flue gas 12F is adsorbed by the mercury adsorbent 23. The mercury adsorbent 23 with adsorbed mercury is ejected from the rear precipitator 20B and is separately discarded.

Thus, in this example, it is possible to recover and reuse the reusable collected matter (fly ash) 29 from the flue gas.

Ninth Example

Next, a system for treating mercury in flue gas according to a ninth example of the invention will be described. In addition, the same constituent elements as in the second example are denoted by the same reference numerals, and the repeated description will not be provided.

Figure 12:
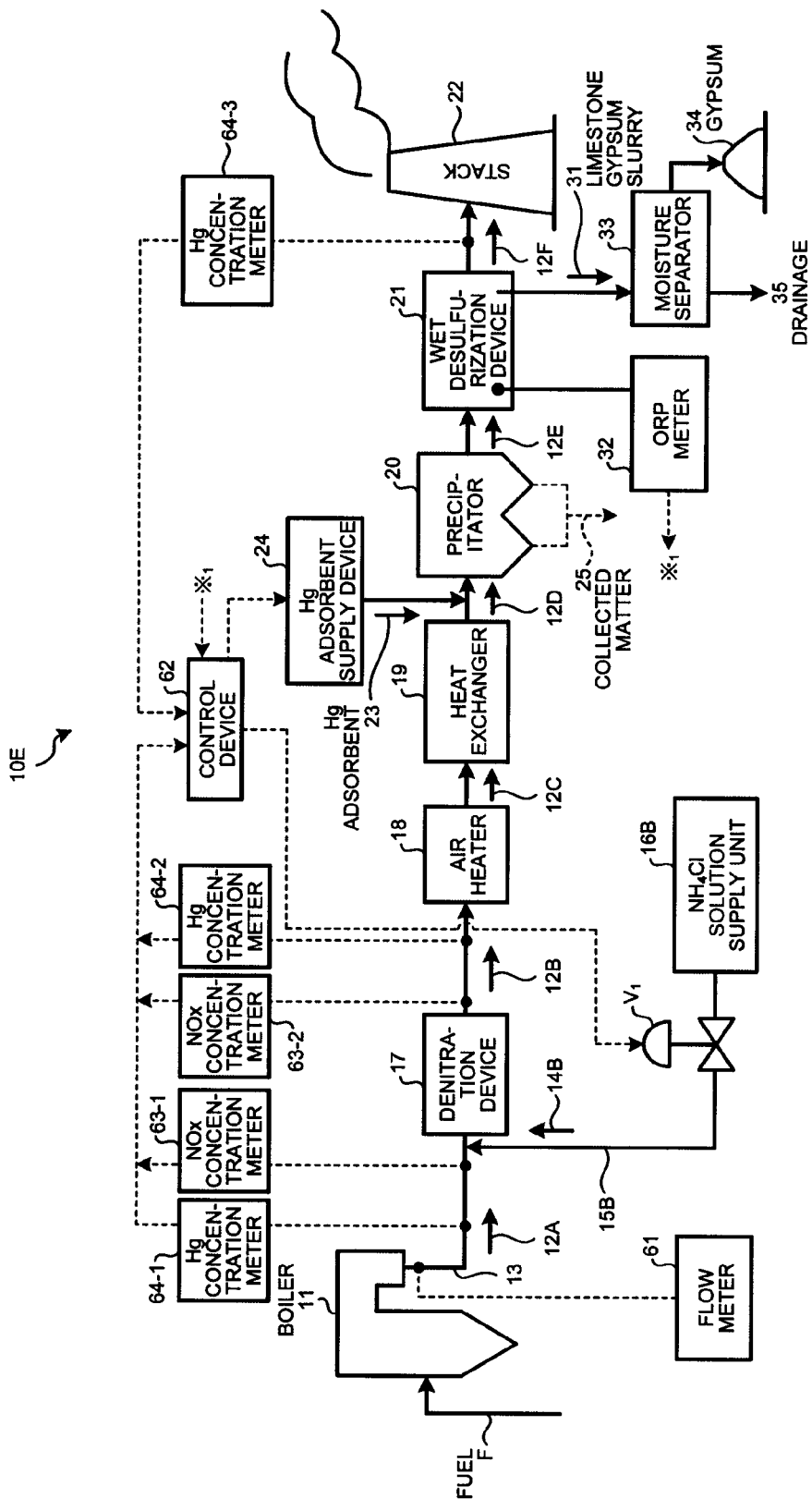
FIG. 12 is a schematic diagram illustrating another system for treating mercury in flue gas according to a ninth example of the invention.

FIG. 12 is a schematic diagram of a system for treating mercury in flue gas according to the ninth example of the invention.

As illustrated in FIG. 12, a system 10E for treating mercury in the flue gas according to this example is provided with various sensor units that measure the mercury concentration and the nitrogen oxide concentration in the flue gas in the second example.

As illustrated in FIG. 12, in this example, NOx concentration meters 63-1 and 63-2 are provided on the inlet and outlet sides of the denitration device 17. The value of NOx concentration in the flue gas measured by the NOx concentration meters 63-1 and 63-2 is transmitted to a control device 62. The control device 62 can check the reduction ratio of NOx in the denitration device 17 from the value of the NOx concentration in the flue gas measured by the NOx concentration meters 63-1 and 63-2. Thus, by controlling the $NH_4Cl$ concentration of the $NH_4Cl$ solution 14B, the supply flow velocity or the like from the value of the NOx concentration in the flue gas measured by the NOx concentration meters 63-1 and 63-2, the supply amount of $NH_4Cl$ of the sprayed $NH_4Cl$ solution 14B can be adjusted so as to satisfy the predetermined denitration performance.

In addition, a flow meter 61 configured to measure the flow velocity of the flue gas 12A is provided on the upstream side to which the $NH_4Cl$ solution 14B is supplied. The flow velocity of the flue gas 12A is measured by the flow meter 61. The value of the flow velocity of the flue gas 12A measured by the flow meter 61 is sent to the control device 62, and it is possible to adjust the flow velocity or the like of the $NH_4Cl$ solution 14B to be injected based on the value of the flow velocity of the flue gas 12A.

Moreover, the flue gas duct 13 is provided with mercury (Hg) concentration meters 64-1, 64-2, and 64-3 that measure the content of Hg in each of the flue gases 12A, 12B, and 12F discharged from the boiler 11. The Hg concentration meter 64-1 is provided in the flue gas duct 13 between the boiler 11 and the $NH_4Cl$ solution supply unit 16B, the Hg concentration meter 64-2 is provided between the denitration device 17 and the air heater 18, and the Hg concentration meter 64-3 is provided on the downstream side of the wet desulfurization device 21. The value of Hg ($Hg^{2+}$, $Hg^0$) concentration in the flue gas 12 measured by the Hg concentration meters 64-1, 64-2, and 64-3 is transmitted to the control device 62. The control device 62 can check the content of Hg contained in the flue gas 12 from the value of the Hg concentration in the flue gas 12 measured by the Hg concentration meters 64-1, 64-2, and 64-3. By controlling the $NH_4Cl$ concentration and supply flow velocity of the $NH_4Cl$ solution 14B from the value of Hg ($Hg^{2+}$, $Hg^0$) concentration in the flue gas 12 measured by the Hg ($Hg^{2+}$, $Hg^0$) concentration meters 64-1, 64-2, and 64-3, the $NH_4Cl$ concentration and supply flow velocity of the sprayed $NH_4Cl$ solution 14B can satisfy the predetermined denitration performance, and the oxidation performance of Hg can be maintained. Furthermore, the control device 62 is able to check the content of Hg contained in the flue gas 12F from the value of Hg concentration in the flue gas 12F measured by the Hg concentration meter 64-3, and is able to adjust the supply amount of the mercury adsorbent 23 from the value of the Hg ($Hg^{2+}$, $Hg^0$) concentration in the flue gas 12F that is measured by the Hg ($Hg^{2+}$, $Hg^0$) concentration meter 64-3.

Furthermore, on the tower bottom of the wet desulfurization device 21, an oxidation-reduction potential measurement control device (ORP meter) 32 configured to measure the oxidation-reduction potential of the limestone gypsum slurry 31 is provided. The value of the oxidation-reduction potential of the limestone gypsum slurry 31 is measured by the ORP meter 32. The measured value is sent to the control device 62 from the oxidation-reduction potential measurement control device (ORP meter) 32 (X-1), and an instruction to adjust the supply amount of air supplied to the tower bottom of the wet desulfurization device 21 based on the value of the measured oxidation-reduction potential is performed by the control device 62. By adjusting the amount of air supplied to the tower bottom, oxidized Hg that is collected in the limestone gypsum slurry 31 stored in the tower bottom of the wet desulfurization device 21 can be prevented from being reduced and can be prevented from being dissipated from the stack 22. In addition, in FIG. 6, reference numeral 33 illustrates a moisture separator (for example, a belt filter or the like), 34 illustrates dehydrated gypsum, and 35 illustrates drainage.

In addition, the oxidation-reduction potential of the limestone gypsum slurry 31 in the wet desulfurization device 21 is preferably within, for example, the range of 0 mV or more and +600 mV or less so as to prevent re-scattering of Hg from the limestone gypsum slurry 31. The reason is that, if the oxidation-reduction potential is within the above-described range, Hg collected as $HgCl_2$ in the limestone gypsum slurry 31 is in a stable region, and it is possible to prevent Hg from re-scattering into the atmosphere.

In FIG. 12, when the amount of mercury in the flue gas 12A from the boiler 11 is 15 $\mu g/m^3 \cdot N$, the mercury concentration in the flue gas 12E from the precipitator 20 was lowered to 0.3 $\mu g/m^3 \cdot N$.

In addition, the mercury concentration in the flue gas 12F after desulfurization by the wet desulfurization device 21 was lowered to 0.04 $\mu g/m^3 \cdot N$.

The mercury removal rate due to this was 99.7%.

Therefore, even when the strict mercury regulations are enforced in the future, by applying the present system and method for treating mercury in flue gas, the removal of mercury in the flue gas is possible.

Moreover, as in the system 10B-3 for treating mercury in the flue gas illustrated in FIG. 4, when providing the front precipitator 20A that collects the mercury adsorbent 23 with adsorbed mercury in the flue gas 12D and the soot, the wet desulfurization device 21 that removes sulfur oxide (SOx) in the flue gas 12E from which the soot and the mercury adsorbent 23 are removed by the precipitator 20, the mercury (Hg) adsorption assistant supply device 29 that is provided on the downstream side of the wet desulfurization device 21 to supply the mercury (Hg) adsorption assistant 28 to the flue gas 12D, and the rear precipitator 20B that collects the mercury adsorbent 23 with adsorbed mercury in the flue gas 12D and the soot, the mercury removal rate was further improved, and the mercury removal rate was 99.9%.

Tenth Example

Figure 13:
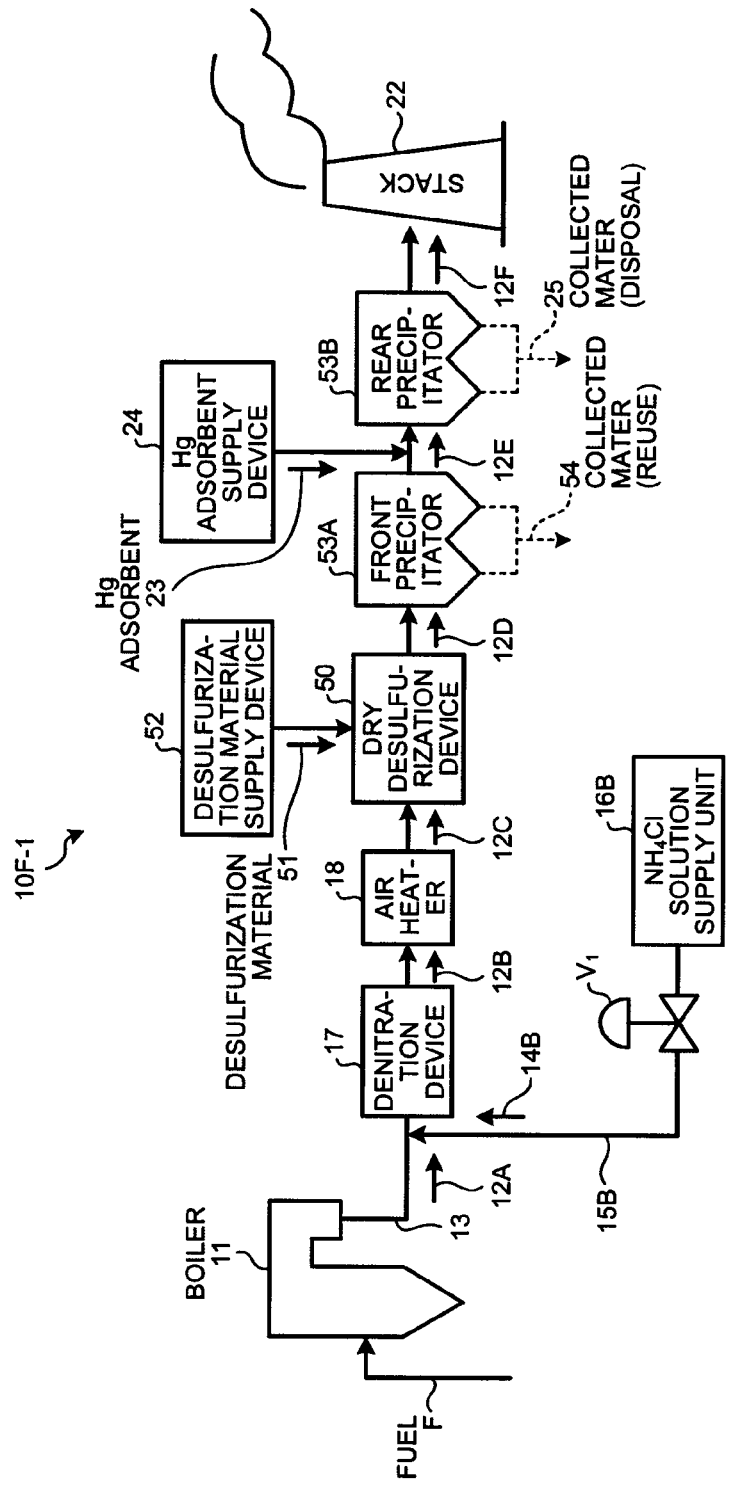
FIG. 13 is a schematic diagram of a system for treating mercury in flue gas according to a tenth example of the invention.

Next, a system for treating mercury in flue gas according to a tenth example of the invention will be described. In addition, the same constituent elements as in the first and second examples are denoted by the same reference numerals, and the repeated description will not be provided. FIG. 13 is a schematic diagram of a system for treating mercury in flue gas according to the tenth example of the invention.

In the system for treating mercury in flue gas according to the first to ninth examples, the wet desulfurization device was used as the desulfurization device, but in this example, the flue gas treatment is performed using a dry desulfurization device.

As illustrated in FIG. 13, a system 10F-1 for treating mercury in flue gas according to this example is a system for treating mercury in flue gas that removes mercury contained in the flue gas 12A from the boiler 11. This system has a denitration device 17 that denitrates nitrogen oxide (NOx) in the flue gas 12A from the boiler 11 that is supplied with fuel F to be boiler-combusted, a dry desulfurization device 50 that is provided on the downstream side of the denitration device 17 and is provided with a desulfurization material supply device 52 configured to supply a desulfurization material 51 for removing sulfur oxide (SOx) in the temperature-regulated flue gas 12C, a front precipitator 53A that recovers the desulfurization material, a mercury (Hg) adsorbent supply device 24 that supplies the mercury (Hg) sorbent 23 to the flue gas 12E after desulfurization, and a rear precipitator 53B that collects the mercury adsorbent 23 with adsorbed mercury in the flue gas 12E and the soot.

As the desulfurization material 51 of the dry desulfurization device 50, for example, it is possible to use calcium carbonate, calcium hydroxide, calcium oxide, sodium bicarbonate, a mineral containing sodium bicarbonate (for example, trona ore) or the like, but the desulfurization material 51 is not limited thereto.

The collected matter 54 in the front precipitator 53A can be reused. Furthermore, the collected matter 25 containing the mercury adsorption assistant collected in the rear precipitator 53B is separately discarded.

Figure 14:
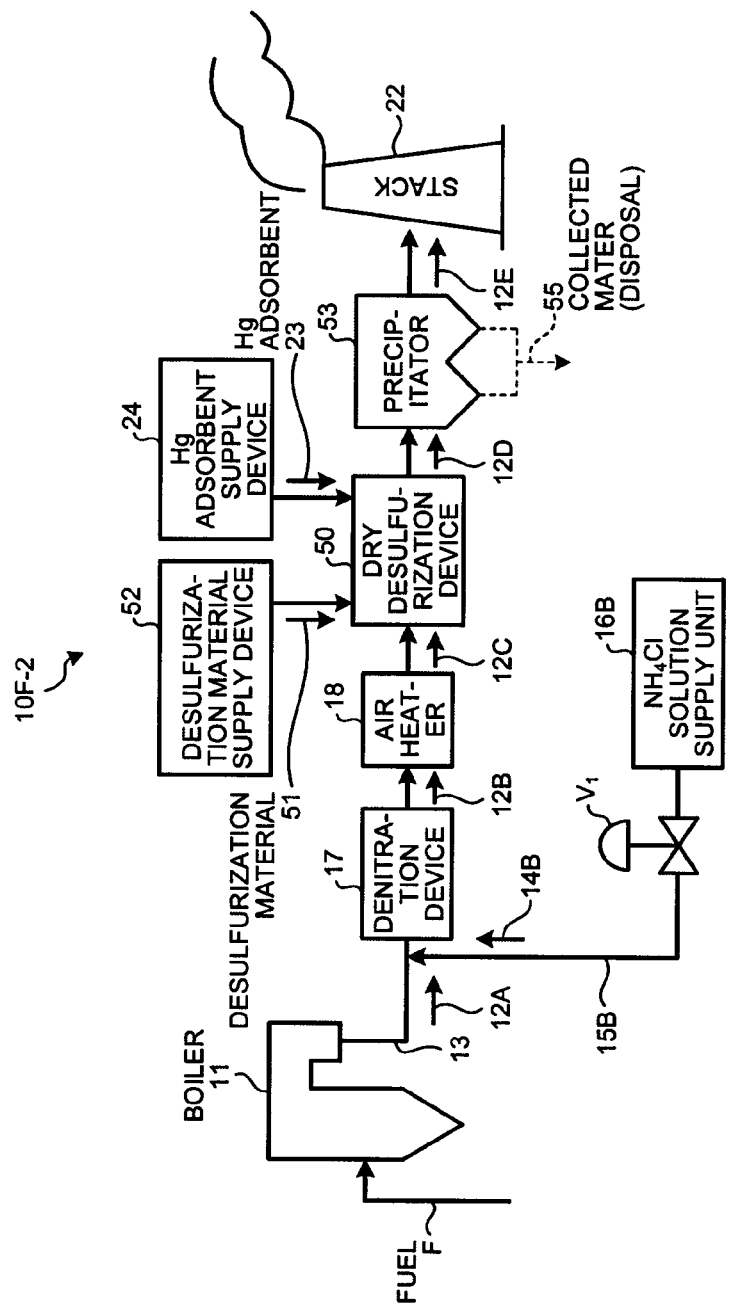
FIG. 14 is a schematic diagram illustrating another system for treating mercury in flue gas according to the tenth example of the invention.

In addition, FIG. 14 is a schematic diagram of another system for treating mercury in flue gas according to the tenth example of the invention.

A system 10F-2 for treating mercury in flue gas according to this example of FIG. 14 simultaneously supplies the desulfurization material 51 and the mercury adsorbent 23 to the dry desulfurization device 50 in the system 10F-1 for treating mercury in the flue gas illustrated in FIG. 13. Thus, it is possible to perform the removal of mercury by the mercury adsorbent 23 in conjunction with the desulfurization by the desulfurization material 51.

In addition, since the mixture of these is collected in the precipitator 53, the collected matter 55 thus collected contains mercury, and thus, mercury is separately isolated or is subjected to disposal.

In the ninth and tenth examples, the case of using the dry desulfurization device has been described, but the invention is not limited thereto, and the invention is also applicable to a case of applying a semi-dry desulfurization device.

REFERENCE SIGNS LIST 10A to 10F SYSTEM FOR TREATING MERCURY IN FLUE GAS
11 BOILER
12A to 12J FLUE GAS
13 FLUE GAS DUCT
17 DENITRATION DEVICE
18 AIR HEATER
19 HEAT EXCHANGER
20 PRECIPITATOR
20A FRONT PRECIPITATOR
20B REAR PRECIPITATOR
21 WET DESULFURIZATION DEVICE
22 STACK
23 MERCURY (Hg) ADSORBENT
24 MERCURY (Hg) ADSORBENT SUPPLY DEVICE
28 MERCURY (Hg) ADSORPTION ASSISTANT
29 MERCURY (Hg) ADSORPTION ASSISTANT SUPPLY DEVICE

The invention claimed is:

1. A system for treating mercury in flue gas, comprising:
a boiler that discharges flue gas containing mercury;
a reduction-oxidation assistant supplying unit that is provided downstream of the boiler to supply a reduction-oxidation assistant;
a denitration device that is provided downstream of the reduction-oxidation assistant supplying to denitrate nitrogen oxide (NOx) in the flue gas;

an air heater that is provided downstream of the denitration device to adjust a temperature of the flue gas;

a heat exchanger that is provided downstream of the air heater to lower the temperature of the flue gas;

a mercury adsorbent supply device that is provided downstream of the heat exchanger and supplies a mercury adsorbent into the flue gas so as to adsorb the mercury with the mercury adsorbent;

a precipitator that is provided downstream of the heat exchanger to collect the mercury adsorbent with adsorbed mercury and soot in the flue gas;

a mercury adsorption assistant supply device that is provided downstream of the precipitator and supplies a mercury adsorption assistant into the flue gas so as to remove mercury remaining in the flue gas; and a desulfurization device that is provided downstream of the mercury adsorption assistant supply device to remove sulfur oxide (SOx) in the flue gas.

2. A method for treating mercury in flue gas comprising:

discharging flue gas containing mercury;

supplying a reduction-oxidation assistant;

denitrating nitrogen oxide (NOx) in the flue gas;

adjusting a temperature of the flue gas;

lowering the temperature of the flue gas;

supplying a mercury adsorbent into the flue gas so as to adsorb the mercury with the mercury adsorbent;

collecting the mercury adsorbent with adsorbed mercury and soot in the flue gas;

supplying a mercury adsorption assistant into the flue gas so as to remove mercury remaining in the flue gas; and removing sulfur oxide (SOx) in the flue gas.

* * * * *